United States Patent
Clingman et al.

(10) Patent No.: US 11,442,987 B2
(45) Date of Patent: Sep. 13, 2022

(54) MEDIA-OBJECT BINDING FOR DISPLAYING REAL-TIME PLAY DATA FOR LIVE-STREAMING MEDIA

(71) Applicant: Sony Interactive Entertainment Inc., Tokyo (JP)

(72) Inventors: Dustin Shawn Clingman, San Mateo, CA (US); Mischa Stephens, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 220 days.

(21) Appl. No.: 16/885,629

(22) Filed: May 28, 2020

(65) Prior Publication Data

US 2021/0374180 A1    Dec. 2, 2021

(51) Int. Cl.
| | |
|---|---|
| *A63F 13/86* | (2014.01) |
| *G06F 16/783* | (2019.01) |
| *G06F 16/735* | (2019.01) |
| *A63F 13/79* | (2014.01) |

(52) U.S. Cl.
CPC .......... *G06F 16/7837* (2019.01); *A63F 13/79* (2014.09); *A63F 13/86* (2014.09); *G06F 16/735* (2019.01); *A63F 2300/556* (2013.01)

(58) Field of Classification Search
CPC ............................... A63F 13/86; G06F 16/735
See application file for complete search history.

(56) References Cited

U.S. PATENT DOCUMENTS

| | | |
|---|---|---|
| 5,913,013 A | 6/1999 | Abecassis |
| 8,448,095 B1 | 5/2013 | Haussila et al. |
| 8,460,108 B2 | 6/2013 | Hendrickson et al. |
| 8,764,555 B2 | 7/2014 | Quan et al. |
| 8,918,728 B2 | 12/2014 | Hamilton et al. |
| 9,155,963 B2 | 10/2015 | Baynes et al. |
| 9,168,460 B2 | 10/2015 | Pearce |
| 9,333,433 B2 | 5/2016 | Cotter |
| 9,381,425 B1 | 7/2016 | Curtis et al. |
| 9,795,879 B2 | 10/2017 | Colenbrander |
| 10,109,003 B1 | 10/2018 | Jenkins et al. |

(Continued)

FOREIGN PATENT DOCUMENTS

| | | |
|---|---|---|
| CN | 113710337 | 11/2021 |
| CN | 113710340 | 11/2021 |

(Continued)

OTHER PUBLICATIONS

U.S. Appl. No. 17/102,881, Mischa Stephens, Media-Activity Binding and Content Blocking, filed Nov. 24, 2020.*

(Continued)

*Primary Examiner* — Jay Trent Liddle
(74) *Attorney, Agent, or Firm* — Polsinelli PC

(57) ABSTRACT

A system and method for media-object binding and displaying real-time play data for live-streaming media is provided. At least one set of object data may be associated with a live-streaming media. One or more media-object bindings between the at least one set of object data and the live-streaming media may be formed and stored in memory or one or more databases. The at least one set of object data may include data about one or more objects displayed in real-time during the live-streaming media.

22 Claims, 5 Drawing Sheets

(56) References Cited

U.S. PATENT DOCUMENTS

| | | | |
|---|---|---|---|
| 10,564,820 B1 | 2/2020 | Cabanero et al. | |
| 10,843,085 B2 | 11/2020 | Stephens | |
| 10,848,805 B1* | 11/2020 | Mattar | H04N 21/47202 |
| 10,881,962 B2 | 1/2021 | Stephens | |
| 11,080,748 B2 | 8/2021 | Stephens | |
| 11,090,568 B1* | 8/2021 | Mattar | A63F 13/211 |
| 11,213,748 B2 | 1/2022 | Jarzebinski | |
| 11,247,130 B2 | 2/2022 | Stephens | |
| 11,269,944 B2 | 3/2022 | Stephens | |
| 2004/0021684 A1 | 2/2004 | Millner | |
| 2007/0198740 A1 | 8/2007 | Peters et al. | |
| 2007/0198939 A1 | 8/2007 | Gold | |
| 2008/0045335 A1 | 2/2008 | Garbow et al. | |
| 2008/0262858 A1 | 10/2008 | Broady et al. | |
| 2009/0115776 A1 | 5/2009 | Bimbra et al. | |
| 2009/0170609 A1 | 7/2009 | Kang et al. | |
| 2009/0276713 A1 | 11/2009 | Eddy | |
| 2010/0070613 A1 | 3/2010 | Chen et al. | |
| 2011/0067061 A1 | 3/2011 | Karaoguz et al. | |
| 2011/0092282 A1 | 4/2011 | Gary | |
| 2011/0113149 A1 | 5/2011 | Kaal | |
| 2011/0314029 A1 | 12/2011 | Fischer et al. | |
| 2011/0319229 A1 | 12/2011 | Corbalis | |
| 2012/0004956 A1 | 1/2012 | Huston et al. | |
| 2012/0094762 A1 | 4/2012 | Khan | |
| 2012/0206574 A1 | 8/2012 | Shikata et al. | |
| 2012/0252583 A1 | 10/2012 | Mikkelsen | |
| 2012/0317198 A1 | 12/2012 | Patton et al. | |
| 2012/0322561 A1 | 12/2012 | Kohlhoff | |
| 2013/0064527 A1 | 3/2013 | Maharajh et al. | |
| 2013/0086484 A1 | 4/2013 | Antin et al. | |
| 2013/0165234 A1 | 6/2013 | Hall et al. | |
| 2013/0212342 A1 | 8/2013 | McCullough et al. | |
| 2013/0244785 A1 | 9/2013 | Gary | |
| 2014/0012922 A1 | 1/2014 | Wu | |
| 2014/0199045 A1 | 7/2014 | Lee et al. | |
| 2014/0204014 A1 | 7/2014 | Thorn et al. | |
| 2014/0206456 A1 | 7/2014 | Koplar | |
| 2014/0228112 A1 | 8/2014 | Laakkonen et al. | |
| 2014/0243097 A1 | 8/2014 | Yong et al. | |
| 2014/0243098 A1 | 8/2014 | Yong et al. | |
| 2014/0274297 A1* | 9/2014 | Lewis | A63F 13/86 463/20 |
| 2015/0026728 A1 | 1/2015 | Carter et al. | |
| 2015/0081777 A1 | 3/2015 | Laine et al. | |
| 2015/0142799 A1 | 5/2015 | Eronen et al. | |
| 2015/0224396 A1 | 8/2015 | Okada | |
| 2015/0245084 A1 | 8/2015 | Downing et al. | |
| 2015/0296250 A1 | 10/2015 | Casper | |
| 2015/0331856 A1 | 11/2015 | Choi et al. | |
| 2015/0381689 A1 | 12/2015 | Ganesh et al. | |
| 2016/0005326 A1 | 1/2016 | Syrmis et al. | |
| 2016/0029153 A1 | 1/2016 | Linn et al. | |
| 2016/0078471 A1 | 3/2016 | Hamedi | |
| 2016/0147890 A1 | 5/2016 | Wissner et al. | |
| 2016/0149956 A1 | 5/2016 | Birnbaum et al. | |
| 2016/0277349 A1 | 9/2016 | Bhatt et al. | |
| 2016/0350813 A1 | 12/2016 | Balasubramanian et al. | |
| 2016/0366483 A1* | 12/2016 | Joyce | H04N 21/4532 |
| 2017/0050111 A1 | 2/2017 | Perry et al. | |
| 2017/0087460 A1 | 3/2017 | Perry | |
| 2017/0126757 A1 | 5/2017 | Kuo et al. | |
| 2017/0188116 A1 | 6/2017 | Major et al. | |
| 2017/0301041 A1 | 10/2017 | Schneider | |
| 2017/0339093 A1 | 11/2017 | Pesavento et al. | |
| 2017/0354888 A1 | 12/2017 | Benedetto et al. | |
| 2018/0001216 A1 | 1/2018 | Bruzzo et al. | |
| 2018/0014077 A1 | 1/2018 | Hou et al. | |
| 2018/0021684 A1 | 1/2018 | Benedetto | |
| 2018/0033250 A1 | 2/2018 | O'Heeron et al. | |
| 2018/0101614 A1 | 4/2018 | Kuipers et al. | |
| 2018/0126279 A1 | 5/2018 | Stelovsky et al. | |
| 2018/0192142 A1 | 7/2018 | Paul | |
| 2018/0295175 A1 | 10/2018 | Smith et al. | |
| 2018/0318708 A1 | 11/2018 | Rom et al. | |
| 2018/0343505 A1 | 11/2018 | Loheide et al. | |
| 2018/0359477 A1 | 12/2018 | Yang | |
| 2019/0052471 A1 | 2/2019 | Panattoni et al. | |
| 2019/0208242 A1 | 7/2019 | Bates et al. | |
| 2019/0246149 A1 | 8/2019 | Reza et al. | |
| 2019/0282906 A1 | 9/2019 | Yong | |
| 2019/0297376 A1 | 9/2019 | McCarty et al. | |
| 2020/0061465 A1* | 2/2020 | Benedetto | A63F 13/46 |
| 2020/0101382 A1 | 4/2020 | Wheeler et al. | |
| 2020/0114267 A1 | 4/2020 | Sakurai | |
| 2020/0147489 A1 | 5/2020 | Mahlmeister et al. | |
| 2020/0169793 A1* | 5/2020 | Åkerfeldt | H04L 65/601 |
| 2020/0184041 A1 | 6/2020 | Andon et al. | |
| 2020/0188781 A1 | 6/2020 | Stephens | |
| 2020/0188792 A1 | 6/2020 | Stephens | |
| 2020/0188794 A1 | 6/2020 | Stephens | |
| 2020/0188796 A1 | 6/2020 | Stephens | |
| 2020/0188800 A1 | 6/2020 | Stephens | |
| 2020/0192929 A1 | 6/2020 | Stephens | |
| 2020/0193476 A1 | 6/2020 | Stephens | |
| 2020/0193477 A1 | 6/2020 | Stephens | |
| 2021/0077907 A1 | 3/2021 | Stephens | |
| 2021/0129023 A1 | 5/2021 | Jarzebinski | |
| 2021/0370169 A1 | 12/2021 | Clingman | |
| 2021/0370185 A1 | 12/2021 | Clingman | |
| 2022/0143516 A1 | 5/2022 | Thielbar | |
| 2022/0193546 A1 | 6/2022 | Jarzebinski | |

FOREIGN PATENT DOCUMENTS

| | | |
|---|---|---|
| CN | 113727764 | 11/2021 |
| CN | 113727765 | 11/2021 |
| CN | 114599432 | 6/2022 |
| JP | 2022-512425 | 2/2022 |
| JP | 2022-512492 | 2/2022 |
| JP | 2022-513485 | 2/2022 |
| JP | 2022-513849 | 2/2022 |
| KR | 2018-0094833 | 8/2018 |
| WO | WO 2009/094611 | 7/2009 |
| WO | WO 2014/047490 | 3/2014 |
| WO | WO 2017/182642 | 10/2017 |
| WO | WO 2017/188677 | 11/2017 |
| WO | WO 2020/123115 | 6/2020 |
| WO | WO 2020/123116 | 6/2020 |
| WO | WO 2020/123117 | 6/2020 |
| WO | WO 2020/123118 | 6/2020 |
| WO | WO 2021/086561 | 5/2021 |
| WO | WO 2021/242476 | 12/2021 |
| WO | WO 2021/242477 | 12/2021 |
| WO | WO 2021/242478 | 12/2021 |
| WO | WO 2022/098707 | 5/2022 |

OTHER PUBLICATIONS

U.S. Appl. No. 16/679,795, Alexander Jarzebinkski, Content Streaming With Gameplay Launch, filed Nov. 11, 2019.*
PCT/US20/54603, Content Streaming With Gameplay Launch, Oct. 7, 2020.*
U.S. Appl. No. 17/566,964, Alexander Jarzebinski, Content Streaming With Gameplay Launch, filed Dec. 31, 2021.*
U.S. Appl. No. 17/517,875, Christopher Thielbar, Replayable Activities for Interactive Content Titles, files Nov. 3, 2021.*
PCT/US21/57832, Replayable Activities for Interactive Content Titles, Nov. 3, 2021.*
PCT Application No. PCT/US2019/062626 International Search Report and Written Opinion dated Jan. 29, 2020.
PCT Application No. PCT/US2019/062606 International Search Report and Written Opinion dated Jan. 30, 2020.
PCT Application No. PCT/US2019/062613 International Search Report and Written Opinion dated Feb. 3, 2020.
PCT Application No. PCT/US2019/062602 International Search Report and Written Opinion dated Feb. 14, 2020.
U.S. Appl. No. 16/220,460 Office Action dated Jan. 28, 2020.
U.S. Appl. No. 16/380,760 Office Action dated Mar. 6, 2020.
U.S. Appl. No. 16/220,465 Office Action dated Jun. 15, 2020.
U.S. Appl. No. 16/358,546 Office Action dated May 20, 2020.

(56) References Cited

OTHER PUBLICATIONS

LI et al., "Distributed Multimedia Systems", IEEE, Jul. 1997, retrieved on [Jul. 2, 2021], Retrieved from the internet <URL:https://citeseerx.ist.psu.edu/viewdoc/download?doi=10.1.1.128.9759&rep1&type=pdf>.
PCT Application No. PCT/US2019/062602 International Preliminary Report on Patentability dated Jun. 8, 2021.
PCT Application No. PCT/US2019/062606 International Preliminary Report on Patentability dated Jun. 8, 2021.
PCT Application No. PCT/US2019/062613 International Preliminary Report on Patentability dated Jun. 8, 2021.
PCT Application No. PCT/US2019/062626 International Preliminary Report on Patentability dated Jun. 8, 2021.
PCT Application No. PCT/US2021/030378 International Search Report and Written Opinion dated Aug. 5, 2021.
PCT Application No. PCT/US2021/030379 International Search Report and Written Opinion dated Aug. 5, 2021.
PCT Application No. PCT/US2021/030380 International Search Report and Written Opinion dated Aug. 12, 2021.
U.S. Appl. No. 16/359,160 Office Action dated Jul. 12, 2021.
U.S. Appl. No. 16/220,443 Office Action dated Aug. 6, 2021.
U.S. Appl. No. 16/220,465 Office Action dated Jul. 26, 2021.
U.S. Appl. No. 16/358,546 Office Action dated Jun. 23, 2021.
PCT Application No. PCT/US2021/057832 International Search Report and Written Opinion dated Feb. 16, 2022.
U.S. Appl. No. 16/358,546 Final Office Action dated Nov. 1, 2021.
U.S. Appl. No. 16/885,635 Office Action dated Mar. 30, 2022.
U.S. Appl. No. 16/359,160 Final Office Action dated Mar. 12, 2021.
U.S. Appl. No. 16/220,443 Final Office Action dated Apr. 13, 2021.
U.S. Appl. No. 16/379,683 Final Office Action dated May 7, 2021.
U.S. Appl. No. 16/679,795 Office Action dated May 10, 2021.
U.S. Appl. No. 16/220,397 Office Action dated Sep. 25, 2020.
U.S. Appl. No. 16/359,160 Office Action dated Nov. 13, 2020.
U.S. Appl. No. 16/220,443 Office Action dated Oct. 19, 2020.
U.S. Appl. No. 16/379,683 Office Action dated Nov. 6, 2020.
PCT Application No. PCT/US2020/054603 International Search Report and Written Opinion dated Jan. 28, 2021.
U.S. Appl. No. 16/220,465 Final Office Action dated Dec. 24, 2020.
U.S. Appl. No. 16/358,546 Final Office Action dated Jan. 27, 2021.
Application No. 19896349.8 Extended European search report dated Jul. 5, 2022.
PCT Application No. PCT/US2020/054603 International Preliminary Report on Patentability dated May 2, 2022.

* cited by examiner

MEDIA-OBJECT BINDING FOR DISPLAYING REAL-TIME PLAY DATA FOR LIVE-STREAMING MEDIA

BACKGROUND

1. Technical Field

The present technology pertains to live-streaming media. More specifically, the present technology may provide for displaying real-time play data for live-streaming media.

2. Background

Gaming media is an increasingly popular and growing information source for game players. Such gaming media (e.g., from a game publisher or game-related content created by peer players) may incentivize further gameplay, promote new features of a game or a new game, or provide gameplay help. Presently available gaming media may include media or live-streaming media broadcasted to one or more viewers (e.g., live-streaming media), which may feature another player broadcasting their gameplay in a live-broadcast live-streaming media. Typically, when viewers are looking for particular content in streaming media with live-broadcast gameplay, viewers have to take, on face value, such as based on the title of the live-streaming media, to determine what the contents of the live-streaming media are. However, viewers can't determine the true contents of the live-streaming media until they watch the live-streaming media.

There is, therefore, a need in the art for systems and methods for displaying real-time play data for live-streaming media based on objects, such as contents, events, and or features, displayed therein.

SUMMARY

Aspects of the present disclosure include systems and methods for media-object binding and displaying real-time play data for live-streaming media based on one or more objects displaying therein is provided. A set of object data associated with at least a portion of the live-streaming media may be stored in memory (or an object database). The live-streaming media (e.g., user-generated content or publisher content) may depict an object, such as an activity. The live-streaming media may have a length of time. The set of object data may include information about the object. The set of object data may include at least one timestamp corresponding to time within the live-streaming media. The set of object data may include data about an object type, object information, such as changes available for the object, whether the object's started or ended, objects most recently started, location change of a user, actor (e.g., an entity with behavior in the game, user-controlled or game-controlled) information, and mechanic (e.g., objects and abilities that impact gameplay) information.

At least one set of object data may be generated basted on or more objects displayed in the live-streaming media. The at least one set of object data may be associated with at least a portion of the live-streaming media. One or more media-object bindings between the at least one set of object data and the live-streaming media may be formed and stored in memory (or one or more databases, e.g., an object database). The live-streaming media may be stored in memory (or one or more databases). Each set of object data may include data about one or more objects (e.g., activities) displayed during at least a portion of the live-streaming media. The real-time play data associated with the at least one set of object data may be displayed in association with the live-streaming media.

One of the one or more objects displayed in the live-streaming media may be an object of interest for categorizing the live-streaming media. A dynamic category of live-streaming media may be formed to include the live-streaming media. The dynamic category may be updated in real-time to limit the dynamic category to live-streaming media that are displaying the object of interest in real-time. The object of interest may be with respect to gameplay, a character, a weapon, a play mode, or a skill level of a player. The dynamic category may be displayed as a results list for a target user. The results list may be further filtered based on characteristics of the target user. The displaying may be based on an input by the target user. Relevant object data for a user may be determined based on game history of the user. An associated dynamic results list may be presented to the user. The associated dynamic results list may include a list of live-streaming media, including the live-streaming media, that each display, in real-time, one or more objects associated with the relevant object data for the user.

Various aspects of the present disclosure may include methods for media-activity binding and displaying real-time play data for a live-streaming media based on one or more objects displaying therein. Such methods may include associating at least one set of object data with at least a portion of the live-streaming media. Such methods may include storing one or more media-object binding between the at least one set of object data and the live-streaming media in one or more databases, each set of object data may include data about the one or more objects displayed in the live-streaming media. Such methods may include displaying the real-time play data associated with the at least one set of object data in association with the live-streaming media.

Additional aspects of the present disclosure may include systems for media-object binding and displaying real-time play data for a live-streaming media based on one or more objects displaying therein. Such systems may include memory that stores at least one set of object data and media-object bindings between the live-streaming media and the at least one set of object data. The memory may further store live-streaming media. Each set of object data may include data about the one or more objects displayed during at least a portion of the live-streaming media. Such system may include one or more processors that executes instructions stored in memory. Execution of the instructions by the one or more processors may associate at least one set of object data with at least a portion of the live-streaming media forming one or more media-object bindings between the at least one set of object data and the live-streaming media and stored in one or more databases, wherein the at least one set of object data comprises data about the object being displayed during live-streaming of the media. Execution of the instructions by the one or more processors may display the real-time play data associated with the at least one set of object data in association with the live-streaming media.

Further aspects of the present disclosure include non-transitory computer-readable medium or storage media having embodied thereon a program executable by a processor to provide a method for media-object binding and displaying real-time play data for a live-streaming media based on one or more objects displaying therein.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Aspects of the present disclosure include systems and methods for media-object binding and displaying real-time play data for a live-streaming media based on one or more objects displaying therein. At least one set of object data may be associated with at least a portion of the live-streaming media. One or more media-object bindings between the at least one set of object data and the live-streaming media may be formed and stored in memory. The at least one set of object data associated with at least the portion of the live-streaming media may also be stored in memory. Each set of object data may include data about the one or more objects displayed during at least the portion of the live-streaming media. The real-time play data associated with the at least one set of object data may be displayed in association with the live-streaming media.

Figure 1:
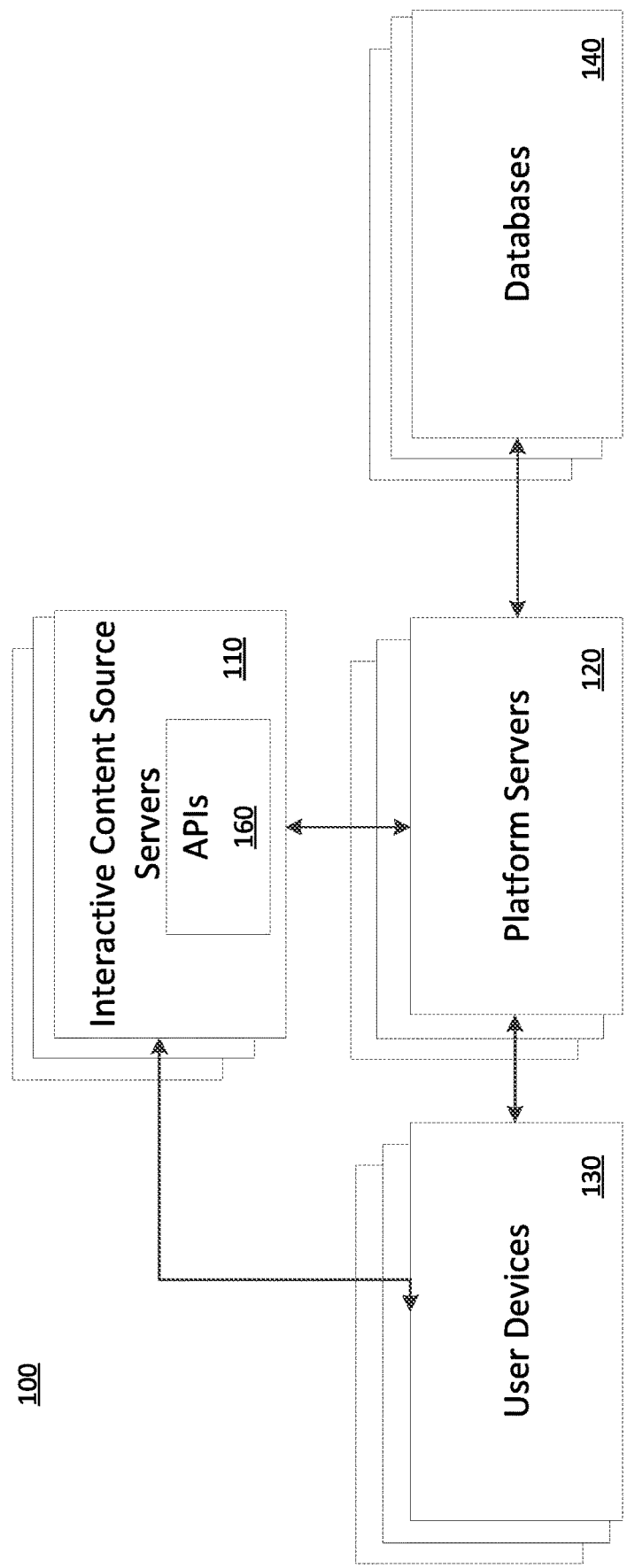
FIG. 1 illustrates an example network environment in which a system for media-object binding and displaying real-time play data for a live-streaming media based on one or more objects displaying therein may be implemented, according to an aspect of the present disclosure.

FIG. 1 illustrates an example network environment 100 in which a system for media-object binding and displaying real-time play data for a live-streaming media based on one or more objects displaying therein. The network environment 100 may include one or more media streaming servers 110 that provide streaming content (e.g., interactive video, podcasts, etc.), one or more platform servers 120, one or more user devices 130, and one or more databases 140.

Media streaming servers 110 may maintain, stream, and host interactive media available to stream on a user device 130 over a communication network. Such media streaming servers 110 may be implemented in the cloud (e.g., one or more cloud servers). Each media may include one or more sets of object data that may be available for participation with (e.g., viewing or interacting with an activity) by a user. Data about the object shown in the media may be stored by the media streaming servers 110, platform servers 120 and/or the user device 130, in an object file 216 ("object file"), as will be discussed in detail with respect to FIGS. 2A and 3.

The platform servers 120 may be responsible for communicating with the different media streaming servers 110, databases 140, and user devices 130. Such platform servers 120 may be implemented on one or more cloud servers. The streaming servers 110 may communicate with multiple platform servers 120, though the media streaming servers 110 may be implemented on one or more platform servers 120. The platform servers 120 may also carry out instructions, for example, receiving a user request from a user to stream live-streaming media (i.e., games, activities, video, podcasts, User Generated Content ("UGC"), publisher content, etc.). The platform servers 120 may further carry out instructions, for example, for streaming the live-streaming media content titles. Such live-streaming media may have at least one object set associated with at least a portion of the live-streaming media. Each set of object data may have data about an object (e.g., activity information, zone information, actor information, mechanic information, game media information, etc.) displayed during at least a portion of the live-streaming media.

The live-streaming media and the associated at least one set of object data may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of object data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An example user device 130 is described in detail herein with respect to FIG. 4.

The databases 140 may be stored on the platform server 120, the media streaming servers 110, any of the servers 218 (shown in FIG. 2A), on the same server, on different servers, on a single server, across different servers, or on any of the user devices 130. Such databases 140 may store the live-streaming media and/or an associated set of object data. Such live-streaming media may depict one or more objects (e.g., activities) that a user can participate in and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC. One or more user profiles may also be stored in the databases 140. Each user profile may include information about the user (e.g., user progress in an activity and/or media content title, user id, user game characters, etc.) and may be associated to media.

Figure 2A:
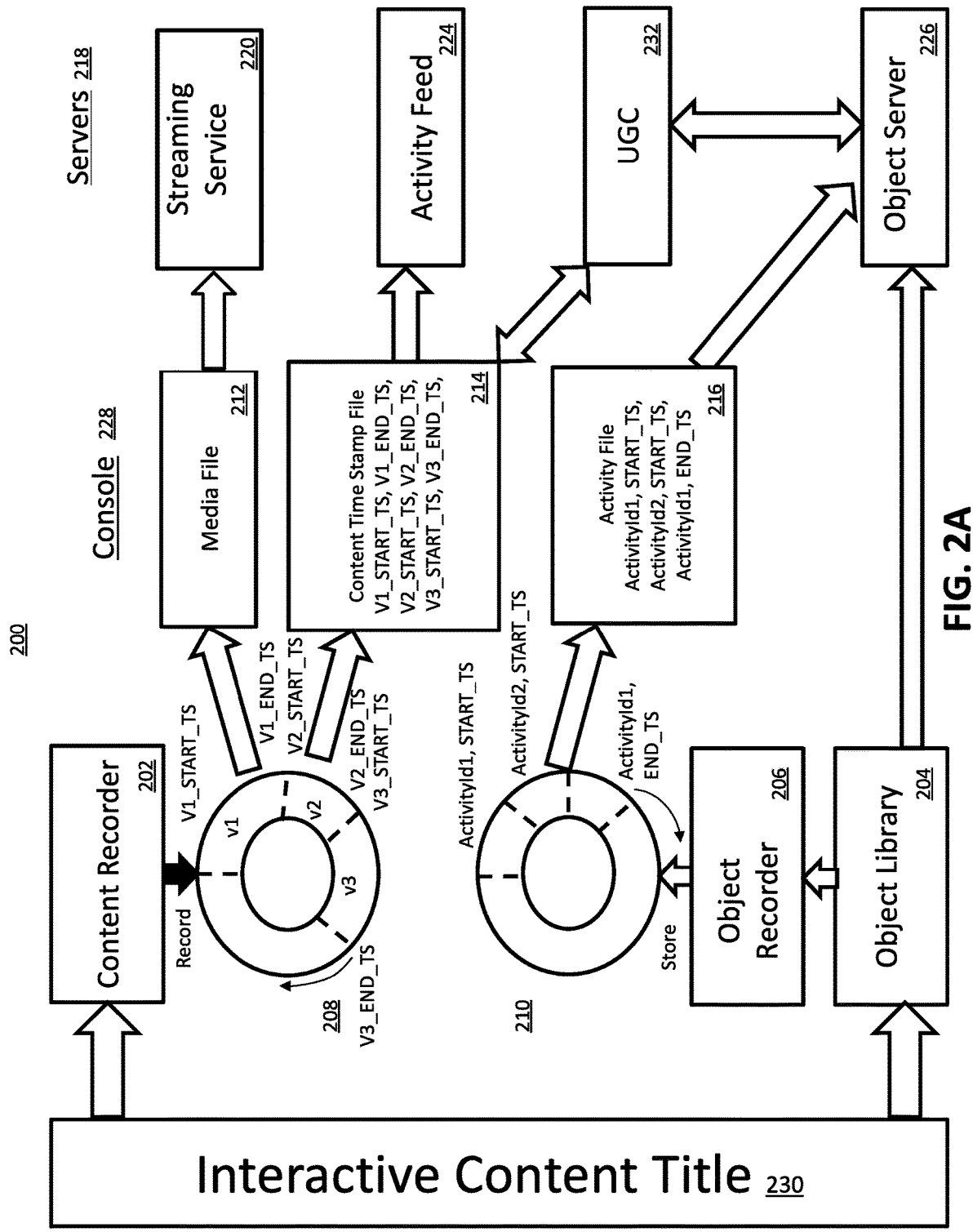
FIG. 2A illustrates a detailed example network in which a system for binding data from a universal data system to user generated content may be implemented, according to an aspect of the present disclosure.

In the example network environment 200 of FIG. 2A, an example console 228 (e.g., a user device 130) and example servers 218 (e.g., streaming server 220, activity feed server 224, UGC server 232, and an object server 226) are shown. In one example, the console 228 may be implemented on the platform server 120, a cloud server, or on any of the servers 218. In an example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 (e.g., a portion of the live-streaming media) may be uploaded to the streaming server 220 for storage and subsequent streaming or use, though the media file 212 may be stored on any server, a cloud server, any console 228, or any user device 130. The media file 212 may be uploaded periodically and/or in real-time or close to real-time. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives object data from the interactive content title 230, and an object recorder 206 tracks the object data to determine when an object beings and ends. Such object data may be uploaded periodically and/or in real-time or close to real-time. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in an object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the object server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for the object file 216. Such query may be executed by searching for an activity ID of the object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 214, 216.

Figure 2B:
FIG. 2B illustrates an example table of various objects and associated events, according to an aspect of the present disclosure.

As shown in the example table 250 of FIG. 2B, such object data (e.g., the object file 216) may be associated with event information regarding activity availability change and may be related to other objects with associated object information. Media-object bindings may form telemetry between the objects shown in at least a portion of the live-streaming media and the live-streaming media. For example, such object data may be zone data files 252, actor data files 254, mechanics data files 256, game media data files 258, and other gameplay-related data files.

Such object data (e.g., the object file 216) may be categorized as in in progress, open-ended, or competitive. Such activity data files 216 may include optional properties, such as a longer description of the activity, an image associated with the activity, if the activity is available to players before launching the game, whether completion of the activity is required to complete the game, whether the activity can be played repeatedly in the game, and whether there are nested tasks or associated child activities. Such activity data files 216 may include an activity availability change event for, which may indicate a list or array of currently available activities for the player. For example, this may be used to decide what activities to display in a game plan.

Such zone data files 252 may indicate an area of an associated game world with a single coordinate system wherein the zone may have a 2-D map associated with it, and may be used to display locations on the zone. If zone data files 252 are applicable, each zone may include a zone ID and a short localizable name of the Zone. Such zone data files 252 may be associated with a view projection matrix (4×4) to convert from 3-D world coordinates to a 2-D map position. Such zone data files 252 may be associated with a location change event that indicates an update to a current in-game location of the player. Such location change event may be posted regularly, or whenever the player's in-game location changes significantly. The platform server 120 may store a latest value in 'state.' Such zone data files 252 may include an x, y, z position of the player's character in the zone as well as an a, b, c vector indicating the player's characters orientation or direction. Such zone data files 252 may be associate with an activity start event and/or an activity end event and for the activity end event, an outcome of completed, failed, or abandoned may be associated to the activity (e.g., activity ID).

Such actor data files 254 may be associated with an entity with behaviors in the game, and can be player-controller or game-controlled, and can change dynamically during gameplay. Such actor data files 254 may include an actor ID for the actor, a localizable name for the actor, an image of the actor, and/or a short description of the actor. Such actor data files 254 may be associated with an actor select event that indicates that the player's selected actor(s) have changed. The selected actor(s) may represent the actors the player is controlling in the game and may be displayed on the player's profile and other spaces via the platform server 120. There may be more than one actor selected at time and each game may replace its list of actors upon loading save data.

Such mechanics data files 256 may be associated with an item, skill, or effect that can be used by the player or the game to impact gameplay (e.g., bow, arrow, stealth attack, fire damage) and may exclude items that do no impact gameplay (e.g., collectibles). Such mechanics data files 256 may include a mechanic ID of the mechanic, a short name of the mechanic, an image of the mechanic, and/or a short description of the mechanic. Such mechanics data files 256 may be associated with a mechanic availability change event that indicates that the mechanics available to the player have changed. Available may mean that the mechanic is available in the game world for the player to use, but may require the player to go through some steps to acquire it into inventory (e.g., buy from a shop, pick up from the world) before using it. Each game may replace its list of mechanics upon loading save data.

Such mechanics data files 256 may be associated with a mechanic inventory change event that indicates that the player's inventory has changed. Inventory may refer to mechanics that are immediately usable to the player without having to take additional steps in the game before using it. Inventory information is used to estimate a player's readiness for various activities, which may be forwarded to the platform server 120. Games may replace its list of mechanic inventory upon loading save data. Mechanics on cool down may be considered part of the inventory. Mechanic counts (e.g., ammunition, healing points) with any non-zero value may be treated as "in inventory." Inventory mechanics may be considered a subset of available mechanics.

Such mechanics data files 256 may be associated with a mechanic use event that indicates that a mechanic has been used by or against the player and may be used to be displayed as mechanic usage in a UGC context. Such mechanics data files 256 may include a list or array of mechanics that were used (e.g, fire arrow, fire damage) or whether an initiator is the player, such that whether the mechanics were used by or against the player. Such mechanics data files 256 may include an initiator actor ID, a current zone ID of the initiator actor, and/or a current x, y, z position of the initiator actor. Such mechanics data files 256 may be associated with a mechanic impact event that indicates that a mechanic had impact on gameplay (e.g., an arrow hit an enemy) and may be used to display mechanic image in a UGC context. Mechanic use and mechanic image events may be not linked. Such mechanics data files 256 may include the initiator action ID, the current zone ID of the initiator actor, the current x, y, z position of the initiator actor, a target actor ID, a current zone ID of the target actor, a current x, y, z of the target actor, and a mitigation mechanic that may mitigate the initiator mechanic.

Such game media data files 258 may be include a game media ID of the game media, a localizable name for the game media, a media format (e.g., image, audio, video, text, etc.), a category or type of media (cut-scene, audiolog, poster, developer commentary, etc.), a URL or a server-provisioned media file, and/or whether the game media is associated with a particular activity. Such game media data files 258 may be associated with a game media start event that indicates that a particular piece of game media has started in the game right now and a game media end event that indicates that the particular piece of game media has ended.

Figure 3:
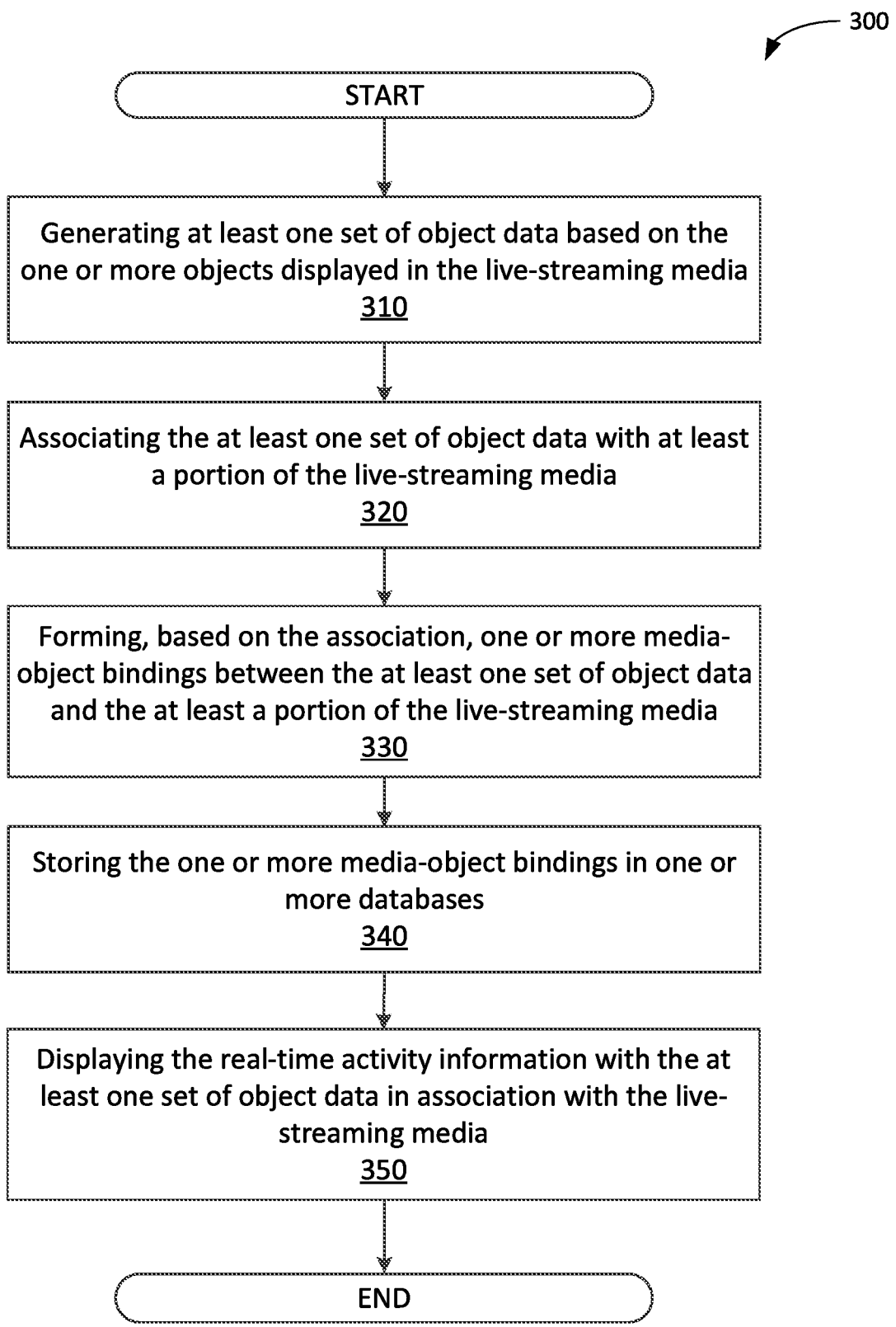
FIG. 3 illustrates a flowchart of an example method for media-object binding and displaying real-time play data for live-streaming media, according to an aspect of the present disclosure.

FIG. 3 is a flowchart illustrating an example method 300 for media-object binding and displaying real-time play data for a live-streaming media based on one or more objects displaying therein. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 3 are performed in the cloud). The steps identified in FIG. 3 (and the order thereof) are examples and may include various alternatives, equivalents, or derivations thereof including but not limited to the order of execution of the same.

In step 310, at least one set of object data (e.g., at least one activity file 216) generated based on the one or more objects displayed in the live-streaming media (e.g., a media file 212). In step 320, the at least one set of object data is associated with at least a portion of the live-streaming media. The at least one set of object data comprises data about the one or more objects displayed in real-time in the live-streaming media. Such association or binding may be based on at least one timestamp of the set of object data associated with one or more timestamps (e.g., a content time stamp file 214) of the live-streaming media. In addition to or alternatively, such association or binding may be based on an activity ID of the set of object data associated with a media ID of the live-streaming media, wherein the set of object data may also include data about the one or more objects displayed during at least a portion of the live-streaming media (e.g., activity results, activity types (e.g., competitive match, quest, task, etc.), user or peer data related to the activity). The set of object data may also include a direct link to the associated object. Such link allows a user to directly access an object. For example, a user may wish to participate in an activity associated with the object shown by a live-streaming media. In the same example, the user can select an option to play the activity shown, and the activity may be automatically launched after selection by the user.

In step 330, based on the association, one or more media-object bindings are formed between the at least one set of object data and the at least a portion of the live-streaming media. In step 340, the one or more media-object bindings are stored in the database 140 or the user devices 130 by the media streaming servers 110 or the platform servers 120. The live-streaming media may be part of an interactive content title 230 or may be UGC (e.g., help video, screen shots, videos, commentary, mashups, etc.) generated by the user, peers, a publisher of the media content title, or a third party. One or more user profiles may also be stored in the database 140 or the user devices 130 by the media streaming servers 110 or the platform servers 120. In step 350, the real-time play data associated with the at least one set of object data may be displayed in association with the live-streaming media.

One of the one or more objects displayed in the live-streaming media may be determined to be an object of interest for categorizing the live-streaming media. A dynamic category of live-streaming media including the live-streaming media may be formed. The dynamic category may be updated in real-time to limit the dynamic category to those which are displaying the object of interest in real-time. The object of interest may be with respect to aspects of gameplay, a character in the game, a weapon of choice, a play mode (e.g., competitive, multi-player, etc.), or a skill level of a player. The dynamic category may further be displayed as a results list for a target user. The results list may further be filtered based on characteristics of the target user, such as their skill level or preferences.

The displaying may be based on an input by the target user who searched for a particular object of interest or a keyword that is associated with the object of interest. A user request may be received by the platform server 120 or the media streaming servers 110 to search for (e.g., filter or find matching or associated keywords) live-streaming media. Such user request may be received from a user device 130. Such user request may include information about the object of interest the user wishes to view and/or to be viewed. The object of interest may be associated with a particular game, a particular character in a game, a particular weapon used in a game, a particular play mode, or any other kind of parameter that would be of interest for a viewer to specifically search. The user request may include information associated with a particular activity, which may also include information associated with activity duration (e.g., calculations regarding activity start times and end times), activity completion, an activity ID, activity results, activity types (e.g., competitive match, quest, task, etc.), user or peer data related to the activity, and other activity-related information.

The platform server 120 may determine if parameters of the search activity matches any of the object data stored in the database 140. The determination may be based on matching keywords or metadata associated with the object data, such as the activity ID, activity type, or other activity-related information. The stored one or more media-object bindings are a subset of a plurality of associations between object data and associated media such that when the determination that a subset of object data matches the search activity, an associated subset of one or more media-object bindings (e.g., media-activity bindings) provides a filtered list of matching live-streaming media to be displayed to the user.

Relevant object data for a user based on game history of a user may be determined and used for determining an associated dynamic results list. The associated dynamic results list may be presented to the user and may comprise a list of live-broadcast live-streaming media that each display, in real-time, one or more objects associated with the relevant object data for the user.

Systems and methods for media-object binding and displaying real-time play data for a live-streaming media based on one or more objects displaying therein. Associating at least one set of object data with a live-streaming media. Storing one or more media-object bindings between the at least one set of object data and at least a portion of the live-streaming media, the set of object data including data about the one or more objects displayed during at least the portion of the live-streaming media. Displaying the real-time play data associated with the at least one set of object data in association with the live-streaming media.

Figure 4:
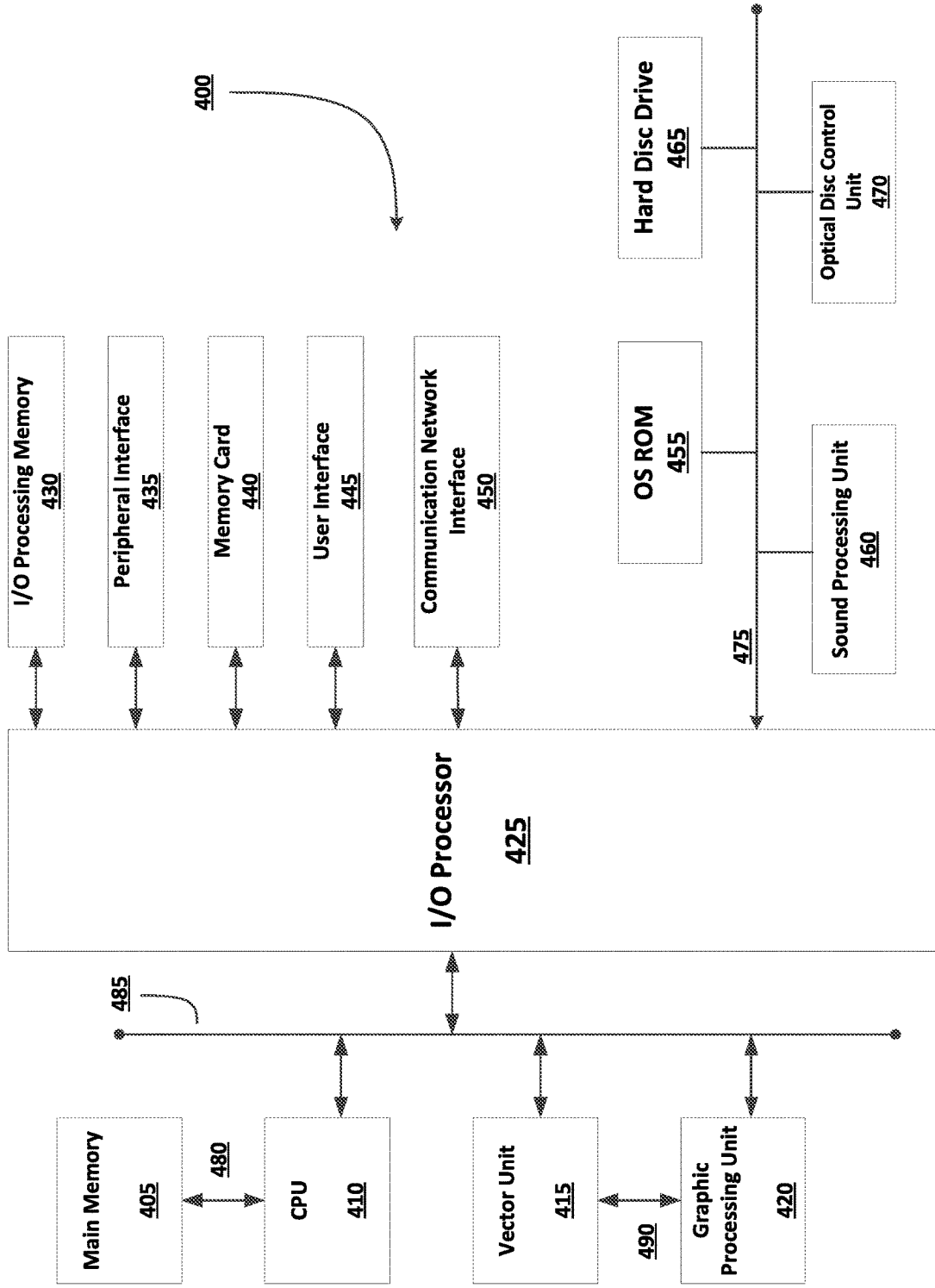
FIG. 4 illustrates an example electronic entertainment system that may be used in media-object binding and displaying real-time play data for a live-streaming media based on one or more objects displaying therein, according to an aspect of the present disclosure.

FIG. 4 is an example user electronic entertainment system that may be used in launching interactive content and providing dynamic interfaces. The entertainment system 400 of FIG. 4 includes a main memory 405, a central processing unit (CPU) 410, vector unit 415, a graphics processing unit 420, an input/output (I/O) processor 425, an I/O processor memory 430, a peripheral interface 435, a memory card 440, a Universal Serial Bus (USB) interface 445, and a communication network interface 450. The entertainment system 400 further includes an operating system read-only memory (OS ROM) 455, a sound processing unit 460, an optical disc control unit 470, and a hard disc drive 465, which are connected via a bus 475 to the I/O processor 425.

Entertainment system 400 may be an electronic game console. Alternatively, the entertainment system 400 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 410, the vector unit 415, the graphics processing unit 420, and the I/O processor 425 of FIG. 4 communicate via a system bus 485. Further, the CPU 410 of FIG. 4 communicates with the main memory 405 via a dedicated bus 480, while the vector unit 415 and the graphics processing unit 420 may communicate through a dedicated bus 490. The CPU 410 of FIG. 4 executes programs stored in the OS ROM 455 and the main memory 405. The main memory 405 of FIG. 4 may contain pre-stored programs and programs transferred through the I/O Processor 425 from a CD-ROM, DVD-ROM, or other optical disc (not shown) using the optical disc control unit 470. I/O Processor 425 of FIG. 4 may also allow for the introduction of content transferred over a wireless or other communications network (e.g., 4G, LTE, 1G, and so forth). The I/O processor 425 of FIG. 4 primarily controls data exchanges between the various devices of the entertainment system 400 including the CPU 410, the vector unit 415, the graphics processing unit 420, and the peripheral interface 435.

The graphics processing unit 420 of FIG. 4 executes graphics instructions received from the CPU 410 and the vector unit 415 to produce images for display on a display device (not shown). For example, the vector unit 415 of FIG. 4 may transform objects from three-dimensional coordinates to two-dimensional coordinates, and send the two-dimensional coordinates to the graphics processing unit 420. Furthermore, the sound processing unit 460 executes instructions to produce sound signals that are outputted to an audio device such as speakers (not shown). Other devices may be connected to the entertainment system 400 via the USB interface 445, and the communication network interface 450 such as wireless transceivers, which may also be embedded in the system 400 or as a part of some other component such as a processor.

A user of the entertainment system 400 of FIG. 4 provides instructions via the peripheral interface 435 to the CPU 410, which allows for use of a variety of different available peripheral devices (e.g., controllers) known in the art. For example, the user may instruct the CPU 410 to store certain game information on the memory card 440 or other non-transitory computer-readable storage media or instruct a character in a game to perform some specified action.

The present disclosure pertain to an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. Aspects of the present disclosure may also be implemented with cross-title neutrality and/or may be utilized across a variety of titles from various publishers.

Aspects of the present disclosure may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as other network interfaces and network topologies to implement the same.

In some aspects of the present disclosure, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

The foregoing detailed description of the technology has been presented for purposes of illustration and description. It is not intended to be exhaustive or to limit the technology to the precise form disclosed. Many modifications and variations are possible in light of the above teaching. The described aspects of the present disclosure were chosen in order to adequately explain the principles of the technology, its practical application, and to enable others skilled in the art to utilize the technology along with various modifications as are suited to the particular use contemplated. It is intended that the scope of the technology be defined by the claim.

What is claimed is:

1. A method of media-object binding and displaying real-time play data for a live-streaming media based on one or more objects displaying therein, the method comprising:
    associating at least one set of object data with at least a portion of the live-streaming media, wherein the at least one set of object data comprises data about the one or more objects displayed in real-time in the live-streaming media;
    forming, based on the associating, one or more media-object bindings between the at least one set of object data and the at least the portion of the live-streaming media;
    storing the one or more media-object bindings in one or more databases;
    determining one of the one or more objects displayed in the live-streaming media is an object of interest for categorizing the live-streaming media;
    forming a dynamic category of live-streaming media including the live-streaming media, wherein the dynamic category is updated in real-time to limit the dynamic category to live-streaming media that are displaying the object of interest in real-time; and
    displaying the real-time play data associated with the at least one set of object data in association with the live-streaming media.

2. The method of claim 1, further comprising:
    prior to the associating, generating the at least one set of object data based on the one or more objects displayed in the live-streaming media.

3. The method of claim 1, further comprising:
    determining relevant object data for a user based on game history of the user; and
    presenting an associated dynamic results list to the user, wherein the associated dynamic results list comprise a list of live-streaming media, including the live-streaming media, that each display, in real-time, one or more relevant objects associated with the relevant object data for the user.

4. The method of claim 1, wherein the object of interest is with respect to aspects of gameplay, a character, a weapon, a play mode, or a skill level of a player.

5. The method of claim 1, further comprising:
    displaying the dynamic category as a results list for a target user.

6. The method of claim 5, wherein the results list is further filtered based on characteristics of the target user.

7. The method of claim 5, wherein the displaying is based on an input by the target user.

8. A system for media-object binding and displaying real-time play data for a live-streaming media based on one or more objects displaying therein, the system comprising:
    one or more databases that stores sets of object data and media-object bindings between the live-streaming media and at least one set of object data; and
    one or more processors that executes instructions stored in memory, wherein execution of the instructions by the one or more processors:
        associates the at least one set of object data with at least a portion of the live-streaming media, wherein the at least one set of object data comprises data about the one or more objects displayed in real-time in the live-streaming media;
        forms, based on the association, one or more media-object bindings between the at least one set of object data and the at least a portion of the live-streaming media;
        stores the one or more media-object bindings in the one or more databases;
        determines one of the one or more objects displayed in the live-streaming media is an object of interest for categorizing the live-streaming media;
        forms a dynamic category of live-streaming media including the live-streaming media, wherein the dynamic category is updated in real-time to limit the dynamic category to live-streaming media that are displaying the object of interest in real-time; and
        displays the real-time play data associated with the at least one set of object data in association with the live-streaming media.

9. The system of claim 8, wherein the one or more databases further stores the live-streaming media.

10. The system of claim 8, wherein further execution of the instructions by the one or more processors:
prior to the associating, generates the at least one set of object data based on the one or more objects displayed in the live-streaming media.

11. The system of claim 8, wherein further execution of the instructions by the one or more processors:
determines relevant object data for a user based on game history of the user; and
presents an associated dynamic results list to the user, wherein the associated dynamic results list comprise a list of live-streaming media, including the live-streaming media, that each display, in real-time, one or more objects associated with the relevant object data for the user.

12. The system of claim 8, wherein the object of interest is with respect to aspects of gameplay, a character, a weapon, a play mode, or a skill level of a player.

13. The system of claim 8, wherein further execution of the instructions by the one or more processors:
displays the dynamic category as a results list for a target user.

14. The system of claim 13, wherein the results list is further filtered based on characteristics of the target user.

15. The system of claim 13, wherein the displaying is based on an input by the target user.

16. A non-transitory computer-readable medium having embodied thereon a program executable by one or more processors to perform a method for media-object binding and displaying real-time play data for a live-streaming media based on one or more objects displaying therein, the method comprising:
associating at least one set of object data with at least a portion of the live-streaming media, wherein the at least one set of object data comprises data about the one or more objects displayed in real-time in the live-streaming media;
forming, based on the association, one or more media-object bindings between the at least one set of object data and the at least a portion of the live-streaming media;
storing the one or more media-object bindings in one or more databases;
determining one of the one or more objects displayed in the live-streaming media is an object of interest for categorizing the live-streaming media;
forming a dynamic category of live-streaming media including the live-streaming media, wherein the dynamic category is updated in real-time to limit the dynamic category to live-streaming media that are displaying the object of interest in real-time; and
displaying the real-time play data associated with the at least one set of object data in association with the live-streaming media.

17. The non-transitory computer-readable medium of claim 16, further comprising:
prior to the associating, generating the at least one set of object data based on the one or more objects displayed in the live-streaming media.

18. The non-transitory computer-readable medium of claim 16, further comprising:
determining relevant object data for a user based on game history of the user; and
presenting an associated dynamic results list to the user, wherein the associated dynamic results list comprise a list of live-streaming media, including the live-streaming media, that each display, in real-time, one or more objects associated with the relevant object data for the user.

19. The non-transitory computer-readable medium of claim 16, wherein the object of interest is with respect to aspects of gameplay, a character, a weapon, a play mode, or a skill level of a player.

20. The non-transitory computer-readable medium of claim 16, further comprising:
displaying the dynamic category as a results list for a target user viewing the results list.

21. The non-transitory computer-readable medium of claim 20, wherein the results list is further filtered based on characteristics of the target user.

22. The non-transitory computer-readable medium of claim 20, wherein the displaying is based on an input by the target user.

* * * * *